(12) United States Patent
Kenagy

(10) Patent No.: US 6,792,146 B2
(45) Date of Patent: Sep. 14, 2004

(54) METHOD AND APPARATUS FOR ENTRY OF MULTI-STROKE CHARACTERS

(75) Inventor: Jason B. Kenagy, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 10/286,106

(22) Filed: Oct. 31, 2002

(65) Prior Publication Data

US 2003/0053695 A1 Mar. 20, 2003

Related U.S. Application Data

(63) Continuation of application No. 09/548,502, filed on Apr. 13, 2000.
(60) Provisional application No. 60/129,388, filed on Apr. 13, 1999.

(51) Int. Cl.[7] .............................................. G06K 9/48
(52) U.S. Cl. ................ 382/197; 345/179; 345/816; 345/841; 379/93.17; 379/93.27; 382/186; 382/189; 382/202; 382/314

(58) Field of Search .................. 382/185–189, 382/195–198, 202–203, 314–315; 379/93.17, 93.27; 345/179, 811, 816, 841

(56) References Cited

U.S. PATENT DOCUMENTS

| | | | | |
|---|---|---|---|---|
| 4,718,102 A | * | 1/1988 | Crane et al. | 382/185 |
| 5,467,407 A | * | 11/1995 | Guberman et al. | 382/186 |
| 5,923,778 A | * | 7/1999 | Chen et al. | 382/185 |
| 5,933,526 A | * | 8/1999 | Sklarew | 382/189 |
| 6,320,942 B1 | * | 11/2001 | Chang | 379/93.27 |

* cited by examiner

Primary Examiner—Bhavesh M. Mehta
Assistant Examiner—Gregory Desire
(74) Attorney, Agent, or Firm—Philip R. Wadsworth; Charles D. Brown; Nicholas J. Pauley

(57) ABSTRACT

A method or apparatus according to an embodiment of the invention allows for entry of multi-stroke characters via a natural drawing interface and without requiring an expensive stylus-drawing surface combination.

9 Claims, 17 Drawing Sheets

METHOD AND APPARATUS FOR ENTRY OF MULTI-STROKE CHARACTERS

RELATED APPLICATION

This application is a continuation of Utility application Ser. No. 09/548,502, entitled 'A METHOD AND APPARATUS FOR ENTRY OF MULTI-STROKE CHARACTERS' and filed on Apr. 13, 2000, which claims priority to Provisional Application No. 60/129,388, entitled 'SYSTEM AND METHOD FOR STROKE-BASED CHARACTER TEXT ENTRY' and filed on Apr. 13, 1999.

FIELD OF THE INVENTION

This invention relates to symbol entry. Specifically, this invention relates to the entry of multi-stroke symbols or written language characters into an electronic device.

DESCRIPTION OF RELATED ART AND GENERAL BACKGROUND

Recent advances in technology and design have enabled the production of handheld electronic devices (including cellular telephones and portable digital assistants or 'PDAs') that have unprecedented capabilities for storage, processing, and/or communications. Such devices can perform data storing functions, retaining quantities of organized textual information such as names, street addresses, e-mail addresses, telephone numbers, and facsimile numbers for business and/or personal contacts. Data access functions may then be performed to retrieve and display selected portions of this information for its own sake or, alternatively, such portions may be retrieved in order to serve as parameters to other device functions such as e-mail, telephone, or fax communications.

In using a device such as a laptop or desktop computer, information may easily be stored or retrieved by entering text via the typing keyboard. The portability and miniaturization associated with handheld devices, however, leave no room for a typing keyboard, and other methods are required with such devices to support entering text or entering search parameters for retrieving text.

One option is to adapt an existing user interface such as the standard twelve-button telephone keypad (i.e. the digits 0–9 and the characters '#' and '*') for character entry. In this method, the twenty-six letters of the Roman alphabet are mapped to selected keys (as shown in FIG. 1). This method is an unnatural way to enter textual information, however, in part because the mapping must be plural-to-one. In order to enter a single instance of the letter 'C', for example, the user must press the '2' key three times. Such a method is also slow, as the user must observe pauses between keypresses in order to indicate character boundaries (e.g. to distinguish two instances of the letter 'A' from one instance of the letter 'B').

In some cases, character disambiguation processing may be used to reduce the required number of keypresses to some extent. In U.S. Pat. No. 5,818,437, Grover et al. describe a computer that uses a dictionary to map sequences of keypresses to corresponding words on a one-to-one keypress-to-letter basis. Unfortunately, some sequences may correspond to more than one word or string, requiring the user to perform additional actions in order to resolve the ambiguity. In the described device, for example, the sequence '1226' corresponds at least to the strings 'FOOD', 'GOOD', and '1226'. Also, entry becomes more difficult for words that are not already represented in the computer's dictionary. In such cases, this method requires multiple and unfamiliar actions to enter characters. In one described embodiment, for example, each key is mapped to nine symbols, and at least two keypresses are required to select any desired symbol.

Moreover, such methods are unsuitable for languages that have alphabets or character sets of more than about thirty characters, as the number of keys required (and/or the number of characters mapped to a given key) would become too high for practical use. For languages having thousands of characters such as written Chinese or Japanese kanji, any method that relies on character-to-key mapping may be completely unworkable.

Another option is entry of textual characters by the use of single, unbroken strokes called 'unistrokes.' In U.S. Pat. No. 5,596,656, Goldberg describes a method for using a stylus on a suitable writing surface to enter unistrokes, where each unistroke represents a letter of the Roman alphabet, a digit, or a punctuation symbol. As this method is strictly limited to one-stroke entry, however, it requires the user to learn a new writing alphabet, many of whose characters bear little to no resemblance to the characters they represent. The unistroke corresponding to the letter 'E', for example, is a single stroke from right to left, while the unistroke corresponding to the letter 'R' is a single straight stroke from upper left to lower right. The unistroke method may be also unsuitable for languages that include more characters than may conveniently be represented by such an artifice.

Moreover, the unistroke method requires a stylus. On one hand, the stylus may become lost or broken. On the other hand, the stylus may be inconvenient to use in a situation where the user has only one hand free and must use it to hold the device. Additionally, the writing surface required to support such a method consumes a significant portion of the area of the face of the device. Finally, any combination of a stylus and a writing surface that supports such a method will also add considerably to the cost of the device.

SUMMARY OF THE INVENTION

Sets of direction codes are received from an input device. Each direction code relates to one among a predetermined number of directions in a drawing plane, and each set of direction codes relates to a stroke. A character comprising the strokes is displayed.

DETAILED DESCRIPTION OF THE INVENTION

Figure 1:
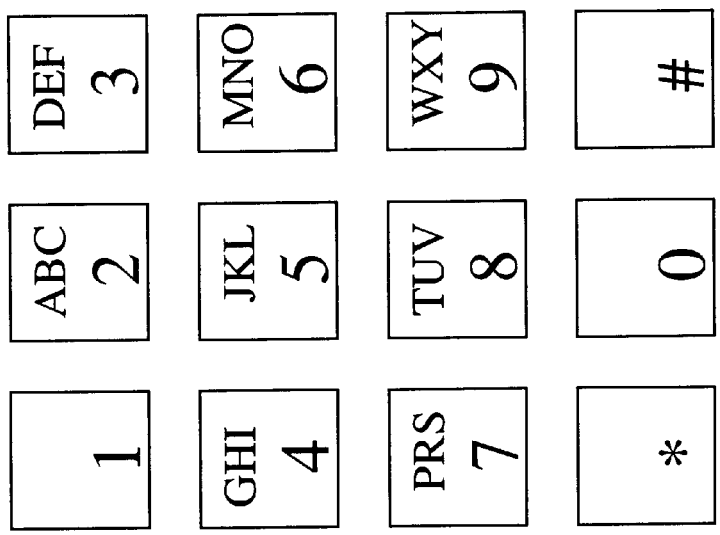
FIG. 1 shows a conventional mapping of the letters of the Roman alphabet to keys of a 12-button keypad.
Figure 2:
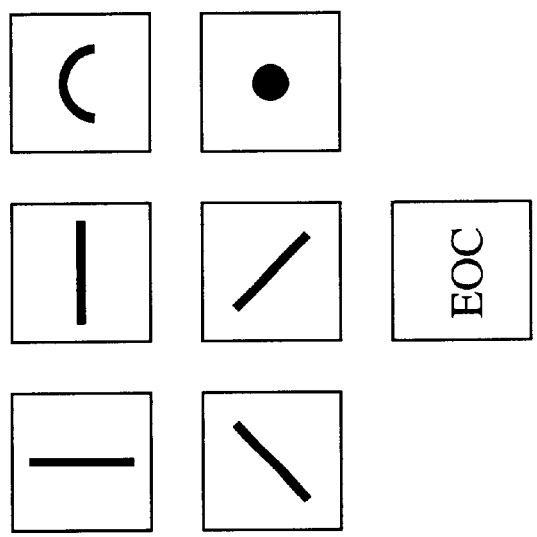
FIG. 2 shows a mapping of elemental strokes and an EOC delimiter to keys.

In a method according to an embodiment of the invention, each among a set of elemental character strokes is associated with a key of a keypad. FIG. 2 shows one example of a set of elemental strokes (comprising a horizontal stroke, a vertical stroke, an ascending (from left to right) diagonal stroke, a descending diagonal stroke, a curve stroke, and a point or accent stroke) and an end-of-character (EOC) delimiter that are mapped to a keypad (or to a portion of a larger keypad).

Figure 3:
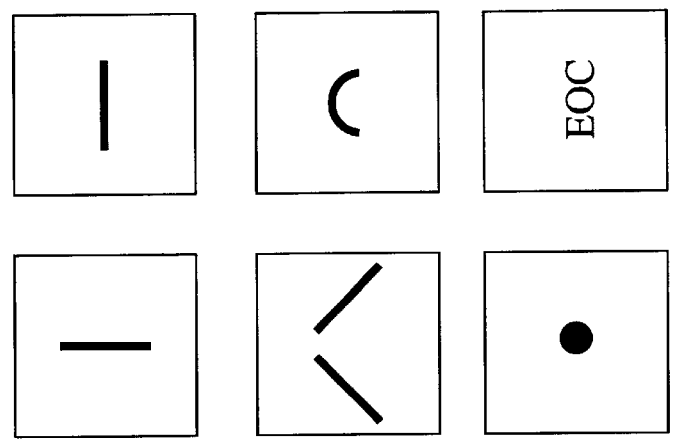
FIG. 3 shows another mapping of elemental strokes and an EOC delimiter to keys.
Figure 4:
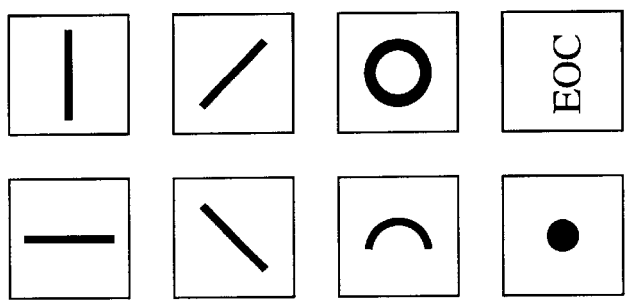
FIG. 4 shows a further mapping of elemental strokes and an EOC delimiter to keys.
Figure 5:
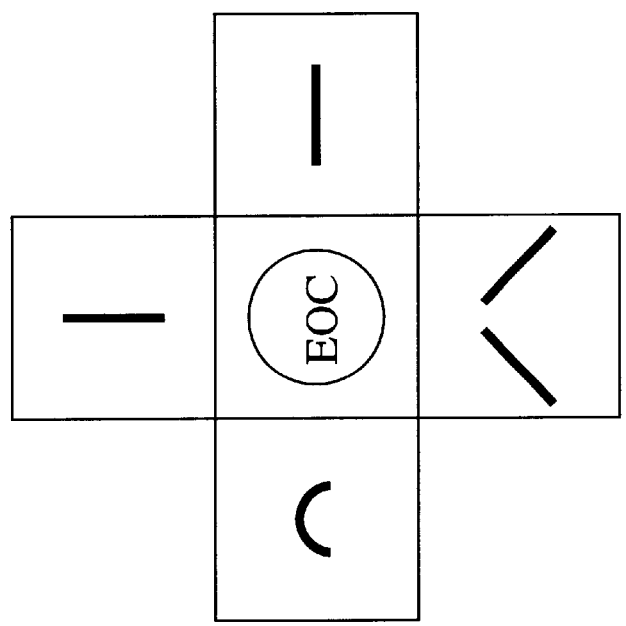
FIG. 5 shows a mapping of elemental strokes and an EOC delimiter to positions of a 4-way-plus-select input device.
Figure 11:
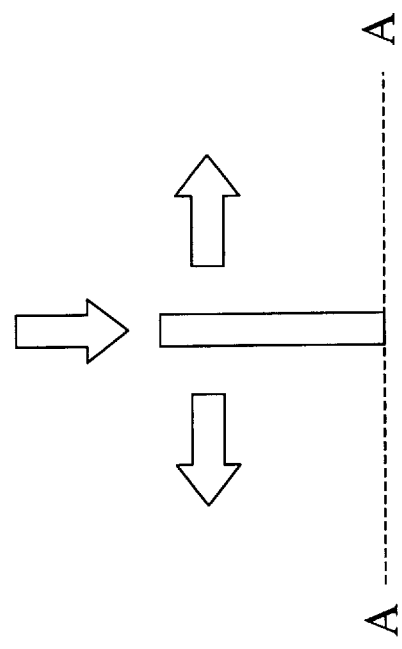
FIG. 11 shows a four-way-plus-select pogo pin.
Figure 11:
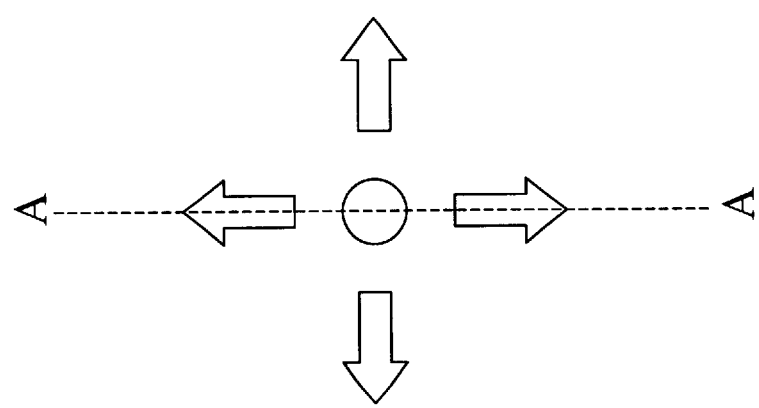

Although the example shown in FIG. 2 uses seven keys, a set that requires fewer keys may be obtained, e.g., by combining the two diagonal strokes into one element (e.g. as in the six-key mapping of FIG. 3), deleting the point or accent element, using a pause of predetermined minimum duration between keystrokes rather than a keypress to indicate EOC delimiting, etc. Likewise, a set that requires more keys may be obtained, e.g., by including a shift key to indicate whether an upper case or a lower case character is being entered, by dividing one or more elemental strokes into a long stroke and a short stroke, by distinguishing loop strokes from circular strokes (as in the eight-key mapping of FIG. 4), etc. FIG. 5 shows a mapping of four elements plus an EOC delimiter onto the positions of a four-way-plus-select rocker switch assembly. With this assembly, pressing one of the four tabs indicates entry of the corresponding element, and pressing the middle of the assembly (i.e. choosing the select action) indicates entry of the EOC delimiter. A similar mapping may be used with a four-way-plus-select pogo stick or pogo pin (as shown in top and side views in FIG. 11).

Figure 6:
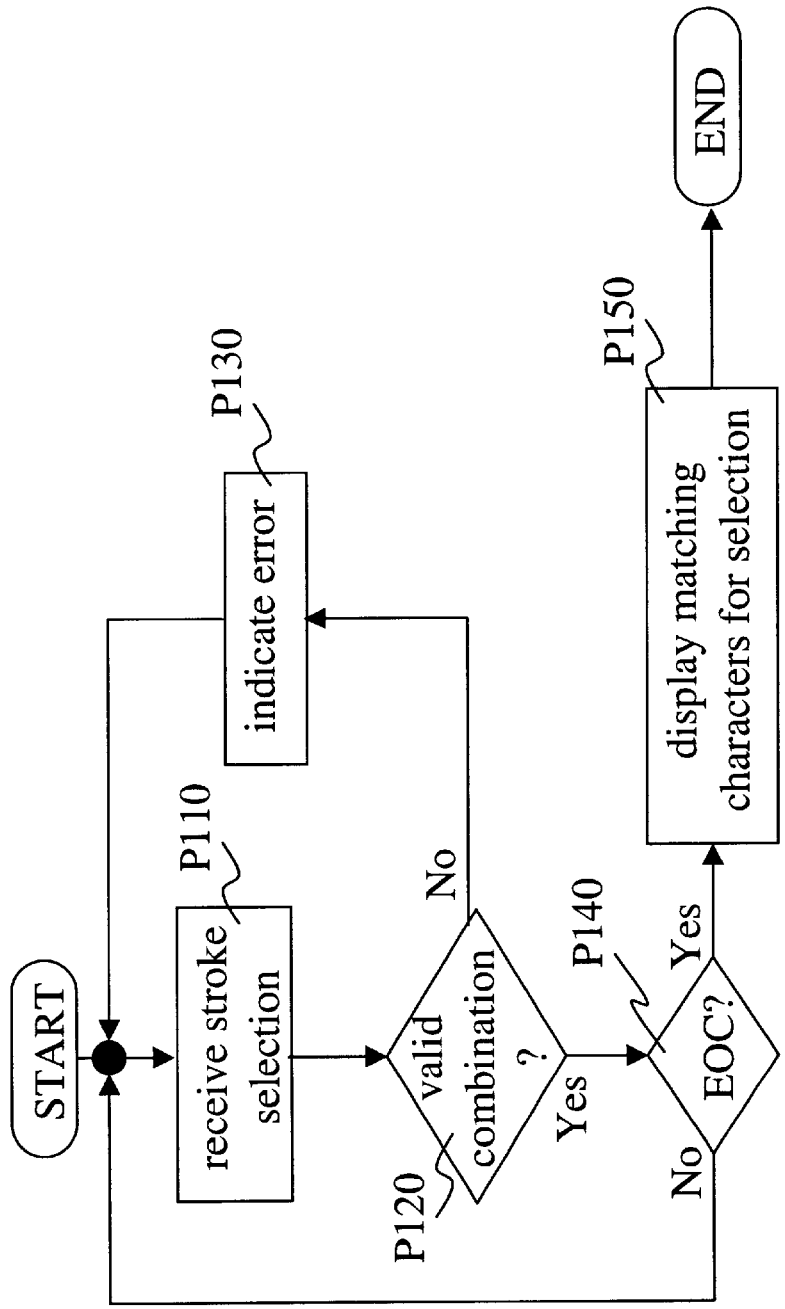
FIG. 6 shows a flowchart of a method according to an embodiment of the invention.

FIG. 6 shows a flowchart of a method according to an embodiment of the invention. In task P110, entry of an elemental stroke or EOC delimiter (i.e. via a keypress or similar action as described above) is received by the device. In task P120, the combination of strokes that has been entered for the current character is used to reference an internal database which maps combinations of strokes to characters. The database may be arranged as a lookup table, as a decision tree, or as another data structure known in the art.

If the combination does not appear in the database, then an error is indicated in task P130 (e.g. via an audible beep and/or a visible indication on a display), the stroke is canceled, and task P110 is repeated. If the combination is valid (i.e. it appears in the database as at least a part of a mapped combination), then in task P140 the action entered in task P110 is compared to the EOC delimiter. Echo of the entered stroke to a display may occur upon entry in task P110, or echo may be suppressed until the validation of task P130 is completed such that only strokes of valid combinations are displayed.

If a match is not detected in task P140, then entry of the next action continues in task P110. If task P140 detects a match, however (i.e. the user has indicated the end of the character), then the characters to which the entered combination is mapped are displayed for selection by the user in task P150. In one example, these characters are arranged on a display in the same configuration as the keys or positions of the input device, enabling the user to easily select the desired character by choosing the corresponding key or position. A scroll function may be provided in cases where the entered combination is mapped to more characters than may be displayed at one time. Audible feedback may also be provided to indicate that entry of a character has been successfully completed.

If the number of remaining possible character matches is reduced to a point where all may be conveniently displayed together, then these remaining characters may be arranged on the display in the same configuration as the keys or positions of the input device, enabling the user to easily select the desired character by choosing the corresponding key or position before the EOC action is performed. In a similar extension, a dictionary of words may be added to a method or apparatus according to an embodiment of the invention such that the number of remaining possible word matches may be displayed for selection.

Figure 7:
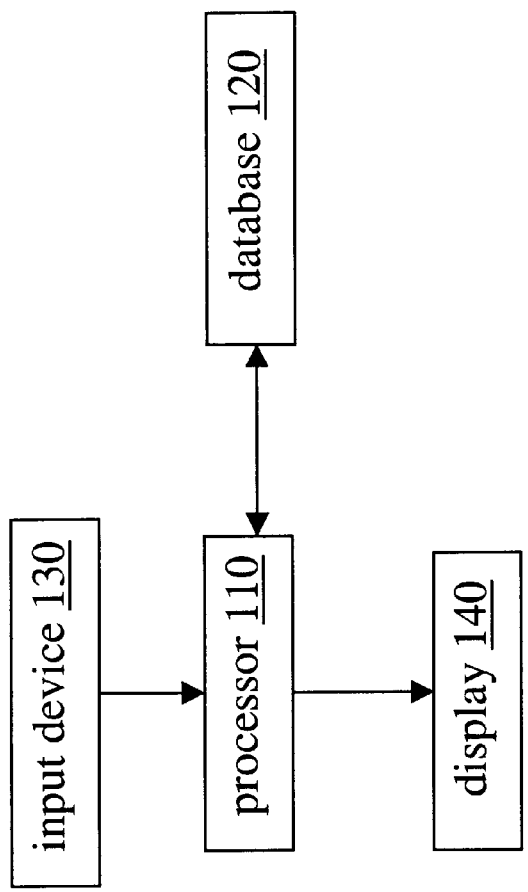
FIG. 7 is a block diagram of an apparatus according to an embodiment of the invention.

FIG. 7 is a block diagram of an apparatus according to an embodiment of the invention. Input device 130 may be a keypad, rocker switch assembly, or pogo pin as described above. Display 140 may be a liquid crystal or other type of flat panel display suitable for a portable device. As noted above, database 120 contains mappings of stroke combinations to characters and may be arranged as a lookup table, decision tree, or other data structure as known in the art. Processor 110 executes instructions to perform the tasks described herein. These instructions may be stored or loaded from a storage element (not shown) such as a semiconductor memory, magnetic medium, or other storage device as known in the art. Processor 110 may comprise one or more microprocessors, digital processing units, or other arrays of logic elements programmable to execute instructions.

For applications relating to an alphabet that has upper and lower cases, recognition support may be limited to characters of a particular case (e.g. the database may contain only mappings to capital letters). In a implementation that supports recognition of both upper- and lower-case characters, a shift key may be included to facilitate disambiguation between letters of different cases (e.g. between upper and lower case 'O', or between upper case 'D' and lower case 'b' or 'p'). Such disambiguation may reduce the number of keystrokes which the user is required to enter by, for example, reducing the number of characters displayed in task P150. In one such implementation, the shift key may be pressed before character entry begins. In an alternative implementation, the shift key may be pressed and held while the strokes of the character are entered, in which case the shift key may be placed on the side of the device for greater ease of use.

While characters of the Roman alphabet contain only a few strokes that may be drawn in any order, the characters of east Asian written languages such as Chinese may contain many strokes that are drawn in a sequence strictly determined by convention. For such applications, character disambiguation may also be facilitated by accounting for the sequential order in which the strokes of a character are entered. For example, such disambiguation may be supported by configuring the decision structure of the database to take sequence into account. For the example of a lookup table, this configuration may entail reducing the number of valid stroke combinations. For the example of a decision tree, this configuration may entail reducing the number of edges between nodes.

Even in applications relating to alphabets whose stroke order is less strictly defined, sequential information may be useful to disambiguation, as it may not be necessary and/or desirable to support stroke orders that are unlikely to appear except in error. In the Roman alphabet, for example, no characters would usually be drawn by beginning with a horizontal stroke followed by a curve or loop stroke.

Figure 8:
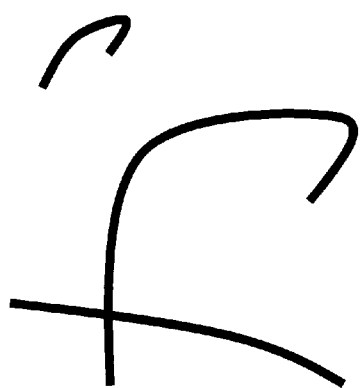
FIG. 8 shows an example of a character having modified strokes.

In some written languages, the manner in which a stroke is terminated may also convey distinguishing information about the character. FIG. 8 shows the example of the Japanese hiragana character 'ka', in which the ends of the first and third strokes are modified as compared to the end of the second stroke. In a method according to a further embodiment of the invention, a user action (e.g. a particular keypress or position selection) is mapped to indicate a modification of the last stroke entered.

Figure 9A:
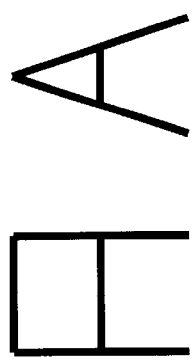
FIG. 9A shows two possible stroke combinations for the letter 'A'.
Figure 9B:
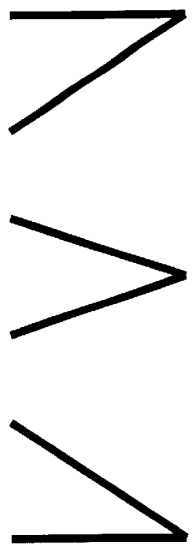
FIG. 9B shows three possible stroke combinations for the letter 'V'.

An apparatus according to an embodiment of the invention may permit several different combinations of strokes to be mapped to a single character. For example, the letter 'A' may be entered with three or four strokes (as in FIG. 9A); the letter 'V' may be entered as any of three different two-stroke combinations (as in FIG. 9B); and the letter 'J' may be entered as a vertical and a horizontal stroke, as a vertical stroke and a curve stroke, or simply as a curve stroke. While a device incorporating an embodiment of the invention may be shipped to recognize all such combinations as valid, convenience of use may be increased by allowing the user to personalize the device by programming it to accept only one of the possible compositions for a particular letter. Alternatively, the device may be configured to learn the particular combinations that the user prefers, thereby reducing the number of keystrokes that the user may be required to enter.

Apart from the number of keystrokes involved, note that a method or apparatus according to a described embodiment of the invention provides a natural and familiar interface to the user. For example, such an interface is more similar to the task of writing the strokes of a character than the conventional method of selecting a letter by pressing an assigned key a predetermined number of times.

Figure 10:
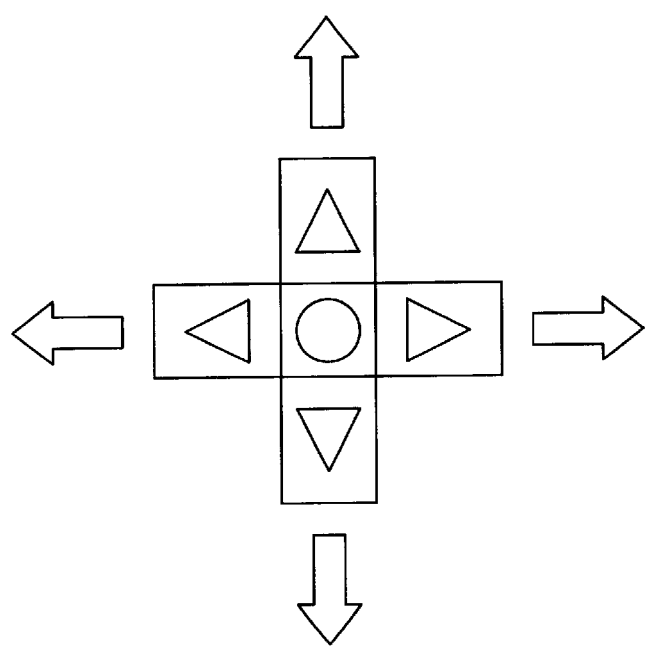
FIG. 10 shows a four-way-plus-select rocker switch assembly.

In a method according to an alternative embodiment of the invention, strokes of a character are formed by user manipulation of an input device. The input device may be a 4-way-plus-select device such as a rocker switch (as shown in FIG. 10) or a 'pogo stick' or 'pogo pin' (as shown in side and top views in FIG. 11). With such a device, the four ways of movement indicate two orthogonal directions in a drawing plane and their inverses, and the select action is used to indicate whether the drawing pen is up (i.e. possibly moving but not drawing) or down (i.e. drawing a stroke as it moves). An EOC indication may be supported by a dedicated button or by a predetermined action (e.g. a quick toggle of the select action at the center detent position).

Figure 12:
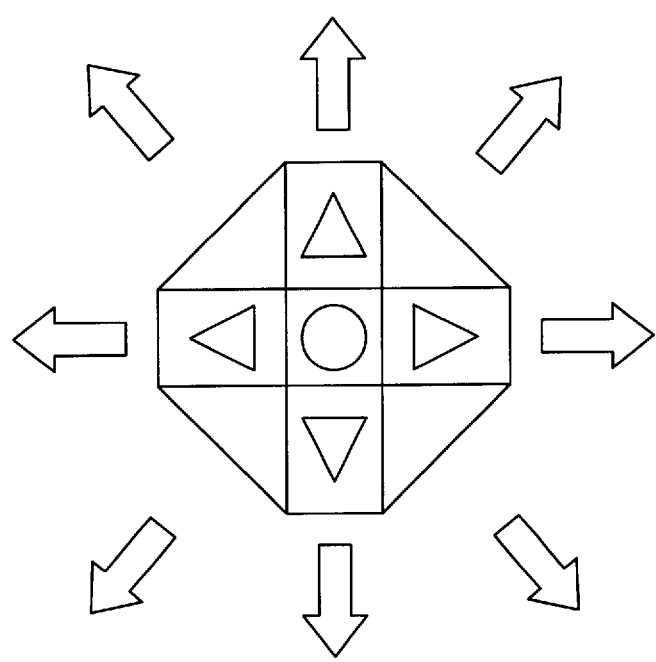
FIG. 12 shows an eight-way-plus-select rocker switch assembly.
Figure 13:
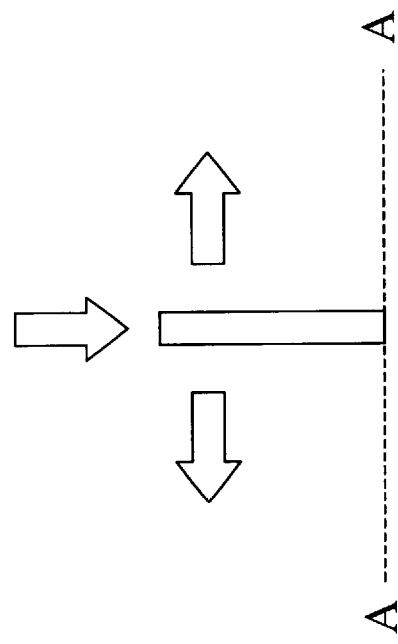
FIG. 13 shows an eight-way-plus-select pogo pin.
Figure 13:
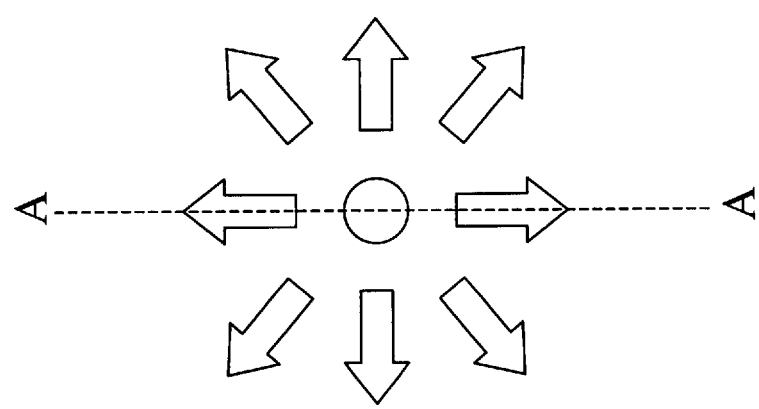

Alternatively, the input device may be an 8-way-plus-select device such as the rocker switch shown in FIG. 12 or the pogo stick shown in FIG. 13. As shown in these figures, the eight ways of movement indicate two pairs of orthogonal directions in a drawing plane and their inverses, one pair being oriented at a forty-five-degree angle to the other. Again, the select action is used to indicate whether the drawing pen is up or down. In another alternative implementation, the input device may be a joystick with select action capability or a trackball with an associated button or other select action capability.

Figure 14:
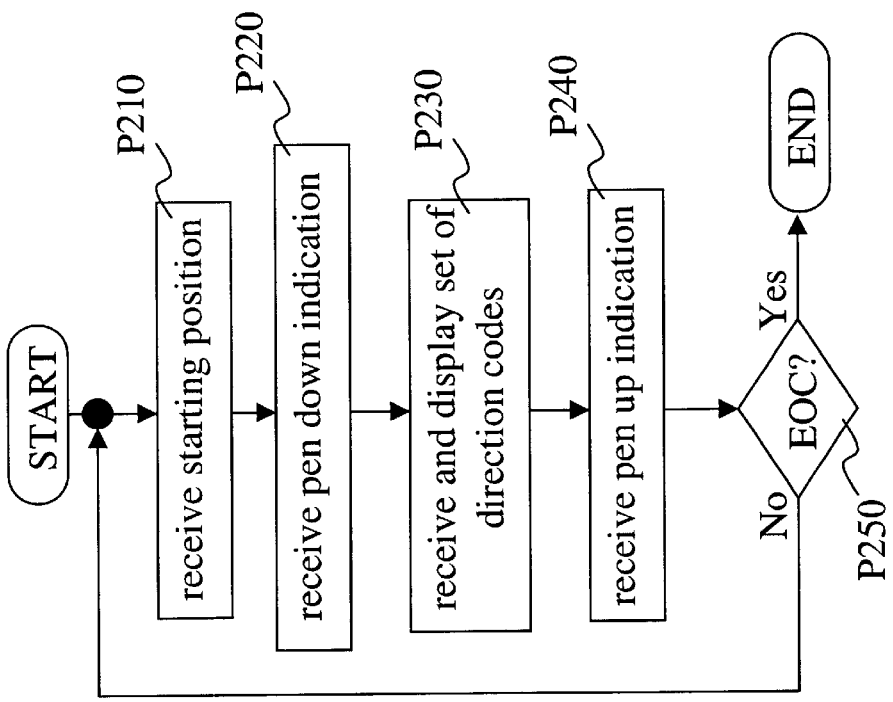
FIG. 14 shows a flowchart of a method according to another embodiment of the invention.
Figure 15A:
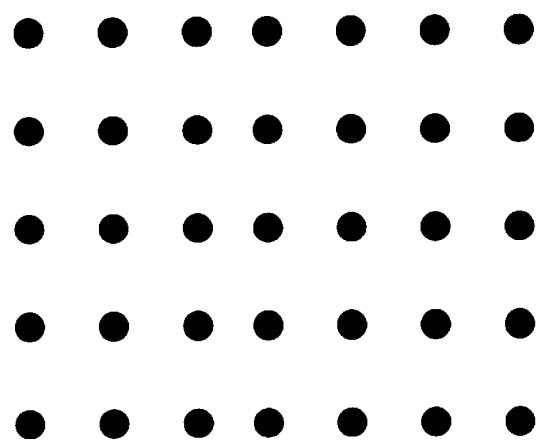
FIG. 15A shows points of a 3×3 bounding box array.
Figure 15B:
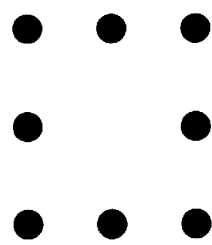
FIG. 15B shows points of a 3×5 and a 5×7 matrix array.
Figure 15B:
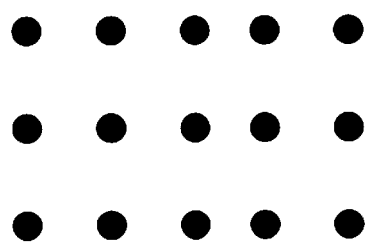

FIG. 14 shows a flowchart for a method according to an embodiment of the invention. In task P40, information establishing a starting position for the stroke is received from the input device. This information is created by user manipulation of the input device, and it relates to a position from which to begin drawing the stroke. The starting position may be a point in a bounding box array (a 3×3 example of such an array is shown in FIG. 15A, although an array of any other size may be used). Alternatively, the position may be a point in a matrix array (3×5 and 5×7 examples are shown in FIG. 15B, although arrays of any other size may be used). It may be desirable for the size of the particular array used to correspond to the grid of the display.

Figure 16:
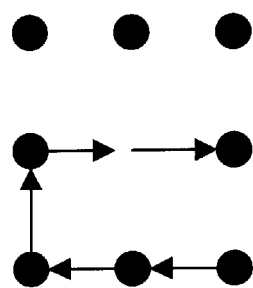
FIG. 16 shows one example of a stroke.

In task P220, an indication is received that drawing of the stroke is to begin, as if a pen were placed on the paper at the starting position (e.g. the pogo pin or rocker switch assembly is depressed). In task P230, a set of direction codes is received as the user draws the stroke. This set may be configured as a string of codes indicating movements in each direction. For a stroke drawn as shown in FIG. 16, for example, where the 'up' direction is denoted as A and the direction orthogonal to the 'up' direction and to the right is denoted as B, the string of codes may appear as (+A, +A, +B, −A, −A). Two alternative representations are (+2A, +1B, −2A) and (2(+A), 1(+B), 2(−A)).

In addition to or in the alternative to a distance in space, a direction code may represent a relative duration in time of a movement in a particular direction. In such a case, it is not necessary for the direction codes as received from the input device to be related to a bounding box or matrix array, although it may be desirable to normalize them to such an array for display purposes. A reference clock may be used to quantify the duration of such movements. Audible feedback may be provided at each clock tick during stroke drawing, and the speed of the clock may be adjustable by the user. (Note that this clock may also be used to support a EOC timeout function in place of or in addition to a dedicated EOC delimiter action.) A string of codes entered in such an implementation for the stroke of FIG. 16 might appear as (+18A, +7B, −23A), for example, which string might be normalized to (+2A, +1B, −2A) for display and/or further processing.

In task P240, a pen-up indication is received from the input device, signaling that stroke entry is completed. In task P250, if the next signal received from the input device is not an EOC delimiter, then the input is interpreted in task P40 as a starting position for the next stroke in the character (in an alternative implementation, the test of task P250 may be executed as the first step in the loop).

Note that in the method of FIG. 14, the user enters a character in a form as it normally appears. In other words, entry of an instantly recognizable character is achieved, and it is not necessary in such an embodiment to provide recognition support in order to complete the task of character entry into the device.

Figure 17:
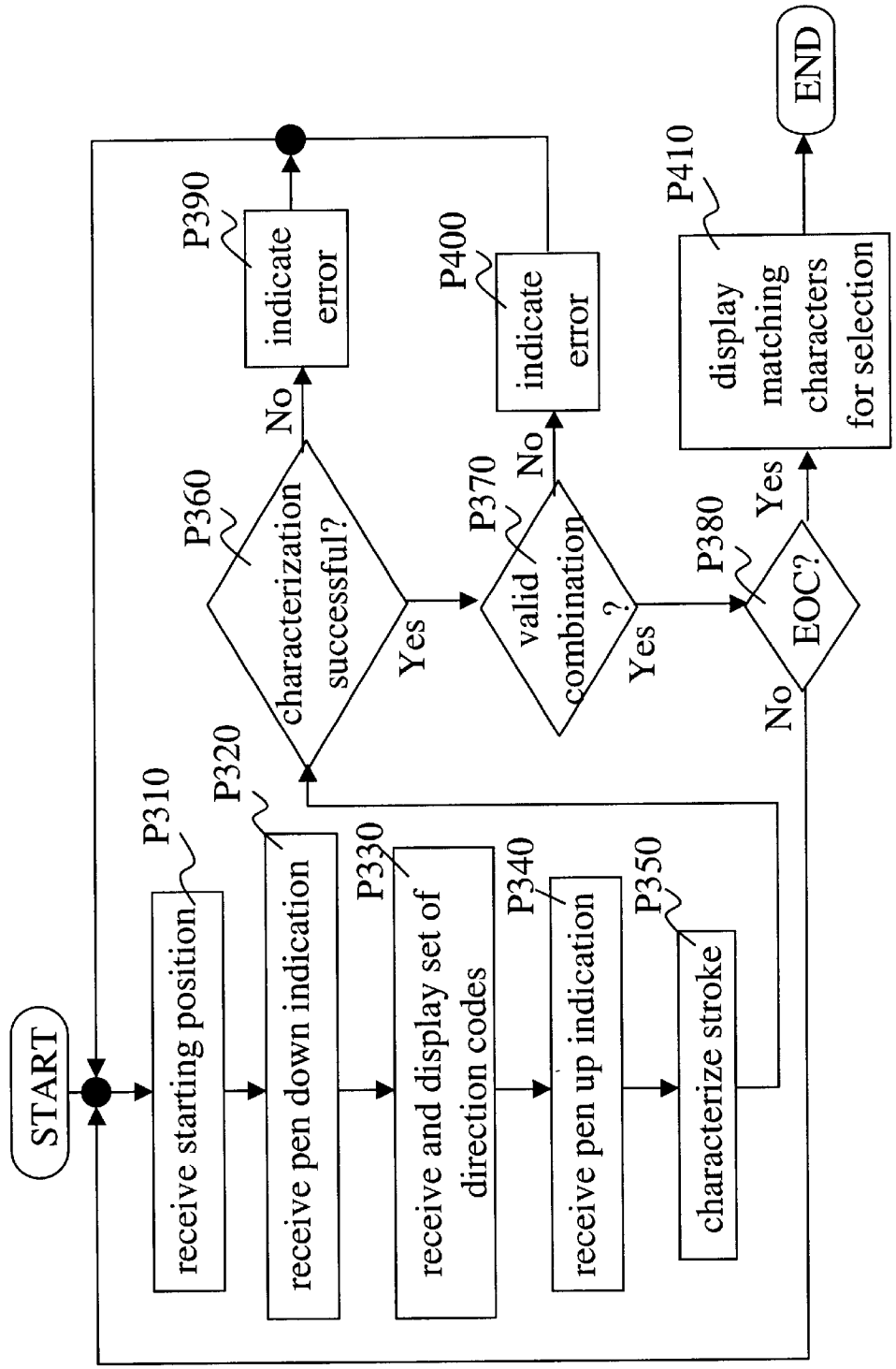
FIG. 17 shows a flowchart of a method according to a further embodiment of the invention.

In a method according to another embodiment of the invention as shown in FIG. 17, recognition of the entered stroke combination as a character is performed. Such a method may output the recognized character in 7- or 8-bit ASCII code, in Unicode, or in a similar standard encoding for textual characters. Tasks P310 through P340 of this method are analogous to tasks P40 through P240 as described above.

An apparatus to execute the method of FIG. 17 includes a database that maps combinations of elemental strokes to characters, as described above. In task P350, the received set of direction codes is compared to a set of elemental strokes. Each stroke in this set may be represented as a set of direction codes, or the received set of direction codes may be mapped to an elemental stroke form before the comparison.

If the received set of direction codes is determined to correspond to one among the set of elemental strokes, then the test of task P360 passes. Otherwise, the received set is rejected in task P390 and the stroke is canceled. An audible and/or visual indication of the error may also be produced. Tasks P370, P380, P400, and P410 may be performed analogously to tasks P120, P140, P130, and P150 in the method of FIG. 6 described above.

As noted above, the sequence in which the strokes of a character are entered may be incorporated in the recognition decision. Other information that may be received from the input device and incorporated in that decision includes stroke direction and relative speed of a stroke or of different portions of a stroke.

Additionally, information relating to the relative positions of strokes within a character may be used for disambiguation. For example, the position of the loop in relation to the downstroke may be used to distinguish a capital 'P' from a lower-case 'b'. Disambiguation may also include ignoring unimportant spatial relations between strokes. A capital 'H' may be recognized, for example, regardless of the distance between the downstrokes and/or whether the cross-stroke actually meets both downstrokes.

In a further embodiment, no stroke characterization (as in task P350) need be performed. In this case, the pattern of entered strokes (e.g. as determined by the bounding box or matrix array points which are crossed in drawing the character) may be recognized by a database (e.g. configured as a decision tree) upon receiving the EOC indication, without reference to individual strokes.

Additional features may be provided in the input device for tactile feedback and ease of use. For example, the input device may provide a discernible click at corner and/or edge positions to clearly indicate a current position to the user. Additionally, the handle of a pogo pin or joystick may be extensible to provide greater resolution and control. In such case, it may be desirable to provide a locking mechanism for the extended handle in order to continue the availability of the up-down select action.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. A method for entry of characters, the method comprising:
   providing a plurality of stroke codes each representing a stroke directions in an X-Y plane;
   providing at least one delimiter code;
   providing a plurality of switches, which when activated, cause one of the plurality of stroke codes or a delimiter code to be generated;
   accepting a sequence of stroke codes terminated by a delimiter code;
   examining sequentially each of the sequence of stroke codes until a delimiter code or an invalid combination of stroke codes is encountered; and
   displaying at least one valid character corresponding to the sequence of stroke codes if the sequence of stroke codes corresponds to at least one valid character.

2. The method of claim 1 wherein providing a plurality of stroke codes representing stroke directions in an X-Y plane comprises providing stroke codes representing stroke directions separated essentially by 90 degrees.

3. The method of claim 1 wherein providing a plurality of stroke codes representing stroke directions in an X-Y plane comprises providing stroke codes representing stroke directions separated essentially by 45 degrees.

4. The method of claim 1 wherein displaying at least one valid character further comprises displaying all valid characters.

5. The method of claim 4 wherein providing means for displaying all valid characters further comprises selecting a desired character from the valid characters.

6. The apparatus of claim 4 wherein the display that displays at least one valid character corresponding to the sequence of stroke codes is configured to display all valid characters and further comprises a selector for selecting a desired character from among the valid characters.

7. The apparatus of claim 6 wherein the selector is one of the plurality of switches.

8. An apparatus for entry of characters, the apparatus comprising:
   an input device that provides a plurality of stroke codes, the stroke codes representing a stroke direction in an X-Y plane or a delimiter code;
   a database that contains valid sequence of stroke codes;
   a processor programmed to accept a sequence of stroke codes terminated by a delimiter and examine sequentially each of the sequence of stroke codes until a delimiter or an invalid stroke code sequence is encountered; and
   a display that displays at least one valid character corresponding to the sequence of stroke codes; wherein
   an apparatus wherein the input device comprises a plurality of switches, each switch, when activated, causes one of the plurality of strokes codes or a delimiter code to be generated;
   wherein the plurality of switches representing stroke codes represent four stroke directions in an X-Y plane separated essentially by 90 degrees.

9. An apparatus for entry of characters, the apparatus comprising:
   an input device that provides a plurality of stroke codes representing a stroke direction in an X-Y plane delimiter code;
   a database that contains valid sequence of stroke codes;
   a processor programmed to accept a sequence of stroke codes terminated by a delimiter and examine sequentially each of the sequence of stroke codes until a delimiter or an invalid stroke code sequence is encountered; and a display that displays at least one valid character corresponding to the sequence of stroke codes; wherein an apparatus wherein the input device comprises a plurality of switches, each switch, when activated, causes one of the plurality of stroke codes or a delimiter code to be generated;

wherein the plurality of switches representing stroke codes represent eight stroke directions in an X-Y plane separated essentially by 45 degrees.

* * * * *